US010854871B2

(12) United States Patent
Nakamura et al.

(10) Patent No.: US 10,854,871 B2
(45) Date of Patent: Dec. 1, 2020

(54) ANODE MATERIAL FOR LITHIUM ION SECONDARY BATTERY, ANODE FOR LITHIUM ION SECONDARY BATTERY, AND LITHIUM ION SECONDARY BATTERY

(75) Inventors: Nobushige Nakamura, Hitachi (JP); Yoshito Ishii, Hitachi (JP); Hidetoshi Honbou, Hitachi (JP); Keiji Okabe, Hitachi (JP); Yuriko Ida, Hitachi (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 0 days.

(21) Appl. No.: 13/812,595

(22) PCT Filed: Jul. 29, 2011

(86) PCT No.: PCT/JP2011/067552
§ 371 (c)(1),
(2), (4) Date: Feb. 20, 2013

(87) PCT Pub. No.: WO2012/015054
PCT Pub. Date: Feb. 2, 2012

(65) Prior Publication Data
US 2013/0143127 A1    Jun. 6, 2013

(30) Foreign Application Priority Data

Jul. 30, 2010   (JP) ................................ 2010-171912
Dec. 21, 2010   (JP) ................................ 2010-284422

(51) Int. Cl.
| H01M 4/133 | (2010.01) |
| H01M 4/587 | (2010.01) |
| H01M 4/36 | (2006.01) |
| H01M 10/0525 | (2010.01) |

(52) U.S. Cl.
CPC .......... *H01M 4/133* (2013.01); *H01M 4/366* (2013.01); *H01M 4/587* (2013.01); *H01M 4/364* (2013.01); *H01M 10/0525* (2013.01)

(58) Field of Classification Search
USPC .................................................... 429/231.8
See application file for complete search history.

(56) References Cited

U.S. PATENT DOCUMENTS

| 5,401,598 A | 3/1995 | Miyabayashi et al. |
| 5,612,155 A * | 3/1997 | Takami .................. D01F 9/145 |
| | | 429/231.8 |
| 5,753,387 A * | 5/1998 | Takami ................. H01M 4/133 |
| | | 423/445 R |
| 6,156,432 A | 12/2000 | Mabuchi et al. |
| 6,403,259 B1 | 6/2002 | Kitagawa et al. |
| 6,482,547 B1 | 11/2002 | Yoon |
| 6,632,569 B1 * | 10/2003 | Kameda ................ H01M 4/133 |
| | | 252/502 |
| 2002/0061445 A1 | 5/2002 | Kitagawa et al. |
| 2006/0035146 A1 | 2/2006 | Hayashi et al. |
| 2006/0147799 A1 | 7/2006 | Hayashi et al. |

FOREIGN PATENT DOCUMENTS

| CN | 1226224 | 8/1999 |
| CN | 1237003 | 12/1999 |
| EP | 0549802 A1 | 7/1993 |
| EP | 1361194 A1 | 11/2003 |
| EP | 1605536 A1 | 12/2005 |
| JP | 4-370662 | 12/1992 |
| JP | 5-307956 | 11/1993 |
| JP | 10-36108 | 2/1998 |
| JP | 11-54123 | 2/1999 |
| JP | 11-354122 | 12/1999 |
| JP | 2001-35493 | 2/2001 |
| JP | 2004-207252 | 7/2004 |
| JP | 2004-273424 | 9/2004 |
| JP | 2006-324237 A | 11/2006 |
| JP | 2007-42571 | 2/2007 |
| JP | 2007042571 | * 2/2007 |
| KR | 10-2000-0019114 A | 4/2000 |
| WO | WO2011084817 | * 12/2009 |

OTHER PUBLICATIONS

Chinese Office Action dated Sep. 19, 2014, Application No. 2011800371843.
Extended Search Report dated Aug. 30, 2016, by the European Patent Office in regards to Appln. No. 11812643.2.

* cited by examiner

Primary Examiner — Ula C Ruddock
Assistant Examiner — Thomas H. Parsons
(74) Attorney, Agent, or Firm — Fitch, Even, Tabin & Flannery, LLP

(57) ABSTRACT

An anode material for a lithium ion secondary battery that includes a carbon material having an average interlayer spacing $d_{002}$ as determined by X-ray diffraction of from 0.335 nm to 0.340 nm, a volume average particle diameter (50% D) of from 1 μm to 40 μm, a maximum particle diameter $D_{max}$ of 74 μm or less, and at least two exothermic peaks within a temperature range of from 300° C. to 1000° C. in a differential thermal analysis in an air stream.

19 Claims, No Drawings

US 10,854,871 B2

ANODE MATERIAL FOR LITHIUM ION SECONDARY BATTERY, ANODE FOR LITHIUM ION SECONDARY BATTERY, AND LITHIUM ION SECONDARY BATTERY

TECHNICAL FIELD

The present invention relates to an anode material for a lithium ion secondary battery, an anode for a lithium ion secondary battery, and a lithium ion secondary battery.

BACKGROUND ART

Lithium ion secondary batteries are light in weight and have high input-output characteristics, compared to other secondary batteries such as nickel metal hydride batteries and lead acid batteries. Therefore, lithium ion secondary batteries have recently attracted attention as a source for high input-output power that is used in, for example, electric vehicles and hybrid vehicles.

Examples of negative electrode active materials used in lithium ion secondary batteries include graphite and amorphous carbon.

Graphite has a structure in which hexagonal network planes of carbon atoms are regularly stacked, and intercalation or deintercalation of lithium ions proceeds at end portions of the stacked network planes, thereby causing charging and discharging.

Amorphous carbon has an irregular stack of the hexagonal network planes, or does not have a network structure. Therefore, intercalation or deintercalation of lithium ions proceeds at the entire surface, and lithium ions that exhibit excellent input-output characteristics tend to be obtained (see, for example, Japanese Patent Application Laid-Open (JP-A) No. 4-370662 and JP-A No. 5-307956). Further, in contrast to graphite, amorphous carbon has such features as low crystallinity, capability to suppress its reaction with an electrolyte solution, and excellent lifetime characteristics.

DISCLOSURE OF THE INVENTION

Problem to Be Solved by the Invention

However, it cannot be said that graphite has sufficient input-output performance for the reason that intercalation or deintercalation of lithium ions proceeds only at end portions. Further, since graphite has a high reactivity at surfaces due to its high crystallinity, there may be a case in which graphite becomes highly reactive with an electrolyte solution especially at high temperatures. Therefore, there is room for improvement in terms of lifetime characteristics of lithium ion secondary batteries.

With regard to amorphous carbon, it has an irregular crystalline structure due to its lower crystallinity than graphite, and the energy density thereof is not sufficient.

As such, there has been demand for a lithium ion secondary battery that has a large energy density, excellent input-output characteristics, excellent lifetime characteristics and excellent thermal stability, and an anode material for obtaining the same.

The present invention aims to provide a lithium ion secondary battery having a large energy density, excellent input-output characteristics, excellent lifetime characteristics and excellent thermal stability; an anode material for a lithium ion secondary battery for obtaining the same; and an anode for a lithium ion secondary battery that is obtained using the anode material.

Means for Solving the Problem

After having intensive studies, the inventors have found that the problem can be solved. That is, according to the embodiments of the present invention, it is possible to provide the following anode material for a lithium ion secondary battery, anode for a lithium ion secondary battery, and lithium ion secondary.

<1> An anode material for a lithium ion secondary battery, comprising a carbon material having an average interlayer spacing $d_{002}$ as determined by X-ray diffraction of from 0.335 nm to 0.340 nm, a volume average particle diameter (50% D) of from 1 µm to 40 µm, a maximum particle diameter $D_{max}$ of 74 µm or less, and at least two exothermic peaks within a temperature range of from 300° C. to 1000° C. in a differential thermal analysis in an air stream.

<2> The anode material for a lithium ion secondary battery according to <1>, wherein the at least two exothermic peaks comprise an exothermic peak having a peak within a temperature range of from 300° C. to less than 700° C., and an exothermic peak having a peak within a temperature range of from 700° C. to 1000° C.

<3> The anode material for a lithium ion secondary battery according to <1> or <2>, wherein a difference in peak temperatures between an exothermic peak having a peak at a highest temperature from among the at least two exothermic peaks, and an exothermic peak having a peak at a lowest temperature from among the at least two exothermic peaks is 300° C. or less.

<4> The anode material for a lithium ion secondary battery according to any one of <1> to <3>, wherein a specific surface area of the carbon material at 77 K as determined by nitrogen adsorption measurement is from 0.5 m²/g to 25 m²/g.

<5> The anode material for a lithium ion secondary battery according to any one of <1> to <4>, wherein an adsorption amount of the carbon material at 273 K as determined by carbon dioxide adsorption measurement is from 0.1 cm³/g to 5.0 cm³/g.

<6> The anode material for a lithium ion secondary battery according to any one of <1> to <5>, wherein a tapped density of the carbon material is from 0.3 g/cm³ to 2.0 g/cm³.

<7> The anode material for a lithium ion secondary battery according to any one of <1> to <6>, wherein an R value obtained from a Raman spectroscopic analysis of the carbon material is from 0.10 to 1.5.

<8> The anode material for a lithium ion secondary battery according to any one of <1> to <7>, wherein the carbon material comprises a first carbon phase that serves as a core, and a second carbon phase that is present on a surface of the first carbon phase and has a lower crystallinity than the first carbon phase.

<9> The anode material for a lithium ion secondary battery according to <8>, wherein a content ratio of the second carbon phase is from 0.1% by mass to 30% by mass with respect to a total mass of the carbon material.

<10> An anode for a lithium ion secondary battery, comprising: an anode material layer that includes the anode material for a lithium ion secondary battery of any one of <1> to <9>; and a current collector.

<11> A lithium ion secondary battery comprising the anode for a lithium ion secondary battery of <10>, a cathode and an electrolyte.

Effect of the Invention

According to the present invention, it is possible to provide a lithium ion secondary battery having a large energy density, excellent input-output characteristics, excellent lifetime characteristics and excellent thermal stability; an anode material for obtaining the lithium ion secondary battery; and an anode for a lithium ion secondary battery that is formed from the anode material.

BEST EMBODIMENT FOR CARRYING OUT THE INVENTION

The anode material for a lithium ion secondary battery (hereinafter, also simply referred to as an "anode material") according to the present invention includes a carbon material that has an average interlayer spacing $d_{002}$ as determined by X-ray diffraction of from 0.335 nm to 0.340 nm, a volume average particle diameter (50% D) of from 1 μm to 40 μm, a maximum particle diameter $D_{max}$ of 74 μm or less, and at least two exothermic peaks within a temperature range of from 300° C. to 1000° C. in differential thermal analysis in an air stream.

The anode material according to the invention, which includes a carbon material that satisfies the characteristics as mentioned above, is capable of providing a lithium ion secondary battery having a large energy density, excellent input-output characteristics, excellent lifetime characteristics and excellent thermal stability.

In the present specification, the term "process" includes not only an individual process but also a process that cannot be distinguished from another process as long as a desired effect is achieved.

In addition, a numerical range expressed by "A to B" refers to a range that includes A and B as the minimum and maximum values, respectively.

When there are plural substances that fall within the same component, the amount of a component included in a composition refers to, unless otherwise specified, the total amount of the plural substances.

Hereinafter, the present invention is described.

<Anode Material>

The anode material according to the invention includes a carbon material that has a specified average interlayer spacing $d_{002}$, a specified volume average particle diameter, a specified maximum particle diameter, and specified exothermic peaks. Any anode material (negative electrode active material) that includes the carbon material may be used as the anode material according to the invention. The content of the carbon material in the total anode material is preferably 50% by mass or higher, more preferably 80% by mass or higher, still more preferably 90% by mass or higher. An anode material consisting only of the carbon material (the content of the carbon material is 100% by mass) is particularly preferable.

The average interlayer spacing $d_{002}$ of the carbon material as determined by X-ray diffraction is from 0.335 nm to 0.340 nm. The closer the average interlayer spacing $d_{002}$ is to a theoretical value of a graphite crystal, which is 0.3354 nm, the energy density tends to be greater, whereas it is impossible to obtain a carbon material having the average interlayer spacing $d_{002}$ of less than 0.335 nm. If the average interlayer spacing $d_{002}$ is greater than 0.340 nm, both the initial charge-discharge efficiency and the energy density of a lithium ion secondary battery are not sufficient. From the viewpoint of the energy density of the lithium ion secondary battery, the average interlayer spacing $d_{002}$ is preferably from 0.335 nm to 0.337 nm.

The average interlayer spacing $d_{002}$ can be calculated by the Bragg equation from a diffraction peak that corresponds to the (002) face of carbon and appears at a diffraction angle 2θ of approximately 24° to 27° of a diffraction profile, which is obtained by exposing a carbon particle powder sample to X rays (CuKα rays) and measuring the diffraction line with a goniometer.

The value of the average interlayer spacing $d_{002}$ tends to decrease as, for example, the temperature for thermal treatment with respect to the carbon material is increased. By utilizing this property, the average interlayer spacing $d_{002}$ can be adjusted to be within the above-described range.

The volume average particle diameter (50% D) of the carbon material included in the anode material is from 1 μm to 40 μm. In a case in which the volume average particle diameter is less than 1 μm, the specific surface area is increased and the initial charge-discharge efficiency of the lithium ion secondary battery is decreased. In addition, contact between the particles becomes insufficient, whereby the input-output characteristics are deteriorated. In a case in which the volume average particle diameter is greater than 40 μm, the electrode surface tends to become irregular and short-circuit of the battery is likely to occur. In addition, since the diffusion distance of Li from the surface of the particle to inside thereof is increased, the input-output characteristics of the lithium ion secondary battery tends to be worsened. From the viewpoints of the initial charge-discharge capacity and the input-output characteristics, the volume average particle diameter of the carbon material is preferably from 3 μm to 35 μm, more preferably from 5 μm to 25 μm.

The volume average particle diameter (50% D) is given as a particle diameter at which a cumulative volume distribution curve of a particle diameter distribution, which is drawn from the smaller particle diameter side, is 50% accumulation. The volume average particle diameter (50% D) can be obtained by dispersing a sample in purified water that includes a surfactant, and measuring the particle diameter of the sample with a laser diffraction particle size distribution measurement instrument (for example, SALD-3000J manufactured by Shimadzu Corporation).

The maximum particle diameter $D_{max}$ of the carbon material included in the anode material is 74 μm or less. In a case in which the maximum particle diameter $D_{max}$ is greater than 74 μm, it is difficult to form a thin electrode plate during preparation of an electrode, whereby input-output characteristics and high rate cycle characteristics are impaired.

The maximum particle diameter $D_{max}$ of the carbon material included in the anode material is preferably 70 μm or less, more preferably 63 μm or less, still more preferably 45 μm or less, from the viewpoint of the input-output characteristics. Further, the maximum particle diameter $D_{max}$ may be generally 10 μm or more, preferably 38 μm or more from the viewpoint of input-output characteristics.

The maximum particle diameter $D_{max}$ can be obtained, for example, by classifying the carbon material with a sieve while decreasing the aperture thereof in the order of, for example, 90 μm, 74 μm, 63 μm, 53 μm, 45 μm and 38 μm, and observing the presence or absence of the sample remaining on the sieve. Specifically, the aperture of the sieve immediately before the sieve on which the sample remains is defined as the maximum particle diameter $D_{max}$. The aperture of the sieve is not limited to the values as mentioned above, as long as the maximum particle diameter $D_{max}$ can be determined.

The carbon material included in the anode material has at least two exothermic peaks that are present within a temperature range of from 300° C. to 1000° C. in differential thermal analysis (DTA) in an air stream (also simply referred to as "exothermic peaks" in the invention). In a case in which there is only one exothermic peak in a temperature range of from 300° C. to 1000° C., it is not possible to obtain a lithium ion secondary battery having energy density, input-output characteristics, lifetime characteristics and thermal stability in combination. The temperature range within which the at least two exothermic peaks appear is preferably from 500° C. to 850° C., since it tends to be easy to achieve a high energy density that is derived from a carbon material such as crystalline graphite carbon, for example, and input-output characteristics, lifetime characteristics and thermal stability that are derived from a carbon material such as amorphous carbon, for example.

The fact that the carbon material has at least two exothermic peaks indicates that the carbon material is formed from a carbon material having plural properties that are distinguishable from each other in the form of plural exothermic peaks. The plural exothermic peaks that are "distinguishable from each other" refer to exothermic peaks that are apart from each other by at least 5° C., which can be determined with an apparatus of certain measurement accuracy.

The differential thermal analysis (DTA) can be carried out with a simultaneous differential calorimetry-thermogravimetry analyzer (for example, EXSTAR TG/DTA6200, manufactured by Seiko Instruments Inc.) More specifically, the analysis is carried out by measuring at a temperature increase rate of 2.5° C./min. under a dry air stream of 300 ml/min. using α-alumina as a reference, and examining the presence or absence of DTA exothermic peaks at from 300° C. to 1,000° C.

The carbon material included in the anode material may have any property or structure, as long as it exhibits plural exothermic peaks that are distinguishable from each other within a temperature range of from 300° C. to 1,000° C. The carbon material may be formed of plural kinds of carbon materials or from a single kind of carbon material. Examples include a carbon material formed of plural types of carbon materials having different properties or structures, a single or plural types of carbon material(s) having a surface property that exhibits plural types of reactivity with respect to oxidation reaction, and a single or plural types of carbon material(s) having different electrochemical characteristics with respect to absorption and release of lithium ions. By using such a carbon material, at least two exothermic peaks can be obtained within the temperature range as described above.

In a case in which the carbon material is formed of plural types of carbon materials, the plural types of carbon materials may be included in the carbon material in any form or state, as long as the carbon material as a whole exhibits exothermic peaks that are distinguishable within a temperature range of from 300° C. to 1,000° C.

Examples of the plural types of carbon materials having different properties or structures include: carbon materials that differ in crystallinity, $N_2$ specific surface area, $CO_2$ adsorption amount or the like; carbon materials that differ in particle shape such as an average particle diameter or a particle aspect ratio; a composite state of the carbon materials having different properties or structures; and carbon materials having different dispersibility or homogeneity of a distribution state or the like. In particular, carbon materials having different crystallinity are preferable from the viewpoint of possessing properties of graphite carbon and amorphous carbon, respectively.

The number of the exothermic peaks is not particularly limited, but is preferably two in a temperature range of from 300° C. to 1,000° C., more preferably two in a temperature range of from 500° C. to 850° C., from the viewpoint of exerting electrochemical characteristics that are specific to graphite carbon and amorphous carbon, respectively.

In order to obtain a carbon material having at least two exothermic peaks within a range of from 300° C. to 1,000° C., the carbon material may be appropriately controlled by, for example, surface properties of the carbon material, types or properties of plural carbon materials contained in the carbon material, a state of composite of plural carbon materials, production conditions of the carbon material, and the like.

The difference between the peaks of the at least two exothermic peaks within a temperature range of from 300° C. to 1,000° C. is not particularly limited, but the difference between an exothermic peak having a peak at the highest temperature and an exothermic peak having a peak at the lowest temperature among the at least two exothermic peaks is preferably 300° C. or less, more preferably from 25° C. to 300° C., still more preferably from 25° C. to 200° C., and particularly preferably from 25° C. to 180° C. When the temperature difference is 300° C. or less, distribution or location of the plural carbon materials that have different properties or structures, and correspond to respective exothermic peaks becomes even and uniform. Therefore, the carbon material that contributes to an exothermic peak at a higher temperature becomes more reactive and the peak temperature decreases. As a result, favorable input-output characteristics, lifetime characteristics and thermal stability of an anode tend to be more likely to be exerted. From the viewpoint of ensuring the exertion of effects derived from the carbon materials having plural properties, the temperature difference is preferably 25° C. or more.

From the viewpoint of improving input-output characteristics, lifetime characteristics and thermal stability, the exothermic peaks preferably include an exothermic peak having a peak within a temperature range of from 300° C. to less than 700° C. (hereinafter, also referred to as a "low temperature region"), and an exothermic peak having a peak within a temperature range of from 700° C. to 1,000° C. (hereinafter, also referred to as a "high temperature region"). More preferably, the exothermic peaks are two exothermic peaks, i.e., one exothermic peak having a peak within the low temperature region and one exothermic peak having a peak within the high temperature region.

The exothermic peaks having at least one peak in the high temperature region and at least one peak in the low temperature region can be obtained by, for example, selecting and using carbon materials having different crystallinity, carbon materials that differ in $N_2$ specific surface area, $CO_2$ adsorption amount or the like; carbon materials that differ in particle shape such as average particle diameter or particle aspect ratio; a composite state of carbon materials that differ in their property or structure as previously mentioned; and carbon materials that differ in dispersibility, such as distribution state, or homogeneity. In particular, it is preferred to use plural carbon materials that differ in crystallinity from the viewpoints of exerting electrochemical characteristics that are particular to graphite carbon and amorphous carbon, respectively, and achieving a high energy density, high input-output characteristics, long lifetime characteristics and excellent thermal stability.

In a case in which the at least two exothermic peaks include an exothermic peak having a peak in the low temperature region and an exothermic peak having a peak in the high temperature region, the temperature difference between an exothermic peak having a peak at the lowest temperature among exothermic peaks having a peak in the low temperature region and an exothermic peak having a peak at the highest temperature among exothermic peaks having a peak in the high temperature region is preferably from 25° C. to 300° C., more preferably from 25° C. to 200° C., and particularly preferably from 25° C. to 180° C.

When the distribution in the anode material of the plural carbon materials that differ in property or structure and correspond to the respective exothermic peaks in the low temperature region and the high temperature region, and the location of one carbon material in the other carbon material become even, the carbon material contributing to an exothermic peak in the high temperature region tends to become more reactive, thereby decreasing the peak temperature. Therefore, when the temperature difference is within 300° C., distribution or arrangement of the carbon materials tends to be uniform and, as a result, favorable input-output characteristics, lifetime characteristics and thermal stability of the anode tend to be achieved. Further, the temperature difference is preferably 25° C. or more, from the viewpoint of ensuring the exertion of effects of the carbon materials having plural properties that correspond to the respective exothermic peaks in the low temperature region and the high temperature region.

For example, in a case in which the carbon materials are different in crystallinity, it is considered that an exothermic peak that appears in the low temperature region is derived from a reaction of low-crystalline carbon in the structure of the anode material and oxygen, and an exothermic peak that appears in the high temperature region is derived from a reaction of crystalline carbon in the structure of the anode material and oxygen. From this, it is considered that the more uniform the distribution of low-crystalline carbon and crystalline carbon in the anode material is, the more uniform and stable the absorption and release reactions of lithium ions are. As a result, it is considered that the input-output characteristics, lifetime characteristics and thermal stability of the anode are more favorable. In that case, in differential thermal analysis (DTA), the temperature difference between the two exothermic peaks is considered to be decreased, because the crystalline carbon is more reactive due to the influence from the uniformly distributed low-crystalline carbon, whereby the reaction temperature is lowered.

The temperature difference in the exothermic peaks can be adjusted by, for example, the type or the property of carbon materials having plural properties that are included in the anode material, the composite state of the carbon materials, the production conditions of the carbon materials, and the like. Specifically, in a case of using a composite material formed of a crystalline carbon material and an organic material having a lower crystallinity than the crystalline carbon material, the temperature difference can be adjusted to be within the above-described range by controlling the type of crystalline carbon material, the type of low-crystalline organic material, the combination of the crystalline carbon material and the low-crystalline organic material, the particle diameter of the crystalline carbon when it is used as a core, the coating amount of the low-crystalline organic material in a case of coating the crystalline carbon as a core with the low-crystalline organic material, the sintering conditions of the carbon material, and the like.

The specific surface area of the carbon material included in the anode material as determined by nitrogen adsorption measurement at 77 K (hereinafter, also referred to as $N_2$ specific surface area) is preferably from 0.5 m$^2$/g to 25 m$^2$/g, more preferably from 0.5 m$^2$/g to 15 m$^2$/g, still more preferably from 0.8 m$^2$/g to 10 m$^2$/g. When the $N_2$ specific surface area is within the above range, a favorable balance between the input-output characteristics and the initial efficiency tends to be maintained. The specific surface area as determined by nitrogen adsorption can be obtained by the BET method from an adsorption isotherm obtained by a nitrogen adsorption measurement at 77 K. The $N_2$ specific surface area tends to be decreased by, for example, increasing the volume average particle diameter of the carbon material in the anode material, increasing the thermal treatment temperature for the carbon material in the anode material, modifying the surface of the carbon material in the anode material, or the like. By utilizing such features, the $N_2$ specific surface area can be adjusted to be within the above-described range. Further, as the $N_2$ specific surface area increases, the exothermic peaks tend to shift toward the lower temperature side.

The adsorption amount of the carbon material included in the anode material as determined by carbon dioxide adsorption at 273 K (hereinafter, also referred to as a "$CO_2$ adsorption amount") is preferably from 0.1 cm$^3$/g to 5.0 cm$^3$/g, more preferably from 0.1 cm$^3$/g to 3.0 cm$^3$/g. When the $CO_2$ adsorption amount is 0.1 cm$^3$/g or more, excellent input-output characteristics tend to be achieved. When the $CO_2$ adsorption amount is 5.0 cm$^3$/g or less, the irreversible capacity caused by a side reaction with an electrolyte solution tends to decrease and a lowering of the initial efficiency tends to be suppressed. The amount of adsorption in carbon dioxide adsorption is expressed by a value obtained at a measurement temperature of 273 K and a relative pressure $P/P_0$ of $3.0 \times 10^{-2}$ (P: equilibrium pressure, $P_0$: 26142 mmHg (3.49 MPa)). The $CO_2$ adsorption amount tends to be decreased by, for example, increasing the volume average particle diameter of the carbon material in the anode material, increasing the thermal treatment temperature for the carbon material in the anode material, selecting plural kinds of carbon materials that differ in crystallinity as the carbon material and reducing the amount of a low-crystalline carbon material, or the like. By utilizing such features, the $CO_2$ adsorption amount can be adjusted to be within the above-described range. Further, as the $CO_2$ adsorption amount increases, the exothermic peaks tend to shift toward the lower temperature side.

The tapped density of the carbon material included in the anode material is preferably from 0.3 g/cm$^3$ to 2.0 g/cm$^3$, more preferably from 0.5 g/cm$^3$ to 2.0 g/cm$^3$, particularly preferably from 0.5 g/cm$^3$ to 1.3 g/cm$^3$. When the tapped density is 0.3 g/cm$^3$ or more, there is no need to use a large amount of an organic binder for the preparation of an anode, whereby a large energy density of the lithium ion secondary battery tends to be obtained. When the tapped density is 2.0 g/cm$^3$ or less, excellent input-output characteristics tend to be obtained. In a case in which carbon materials that differ in crystallinity are used as the plural carbon materials that differ in property or structure, and the tapped density is within the above-described range, there may be moderate pores through which an electrolyte solution penetrates into the anode material in which low-crystalline carbon and crystalline carbon are dispersed. As a result, the charge-discharge reaction is promoted and the anode resistance is decreased, and favorable input-output characteristics are obtained.

The value of the tapped density tends to be increased by, for example, increasing the volume average particle diameter of the carbon material included in the anode material. By utilizing this property, the tapped density can be adjusted to be within the above-described range.

The tapped density of the whole anode material may be adjusted to be from 0.3 g/cm$^3$ to 3.0 g/cm$^3$ by, for example, including a metal powder or the like, which will be described later, in addition to the carbon material.

In the invention, the tapped density refers to a value obtained from the weight and the volume of a sample powder, after slowly placing 100 cm$^3$ of the sample powder into a 100 cm$^3$-volume graduated cylinder, sealing the same, and dropping the same from a height of 5 cm 250 times.

When an R value is given as Id/Ig, which is an intensity ratio of the intensity of a peak that appears at approximately 1,360 cm$^{-1}$ (Id) and the intensity of a peak that appears at approximately 1,580 cm$^{-1}$ (Ig) in a profile obtained by laser Raman spectrometry of the carbon material included in the anode material at an excitation wavelength of 532 nm, the R value is preferably from 0.10 to 1.5, more preferably from 0.15 to 1.0. When the R value is 0.10 or higher, excellent lifetime characteristics and excellent input-output characteristics tend to be obtained. When the R value is 1.5 or lower, an increase in the irreversible capacity tends to be suppressed, and a lowering in the initial efficiency tends to be suppressed.

The peak that appears at approximately 1,360 cm$^{-1}$ is usually identified as a peak that corresponds to an amorphous structure of carbon, and refers to a peak observed at, for example, from 1,300 cm$^{-1}$ to 1,400 cm$^{-1}$. The peak that appears at approximately 1,580 cm$^{-1}$ is usually identified as a peak that corresponds to a graphite crystal structure, and refers to a peak observed at from 1,530 cm$^{-1}$ to 1,630 cm$^{-1}$, for example.

The R value can be obtained with a Raman spectrometer (for example, NSR-1000, manufactured by JASCO Corporation; excitation wavelength: 532 nm), using the entire measurement range (830 cm$^{-1}$ to 1,940 cm$^{-1}$) as the baseline.

An anode material that satisfies the characteristics as described above exhibit excellent input-output characteristics in charge and discharge, excellent lifetime characteristics and excellent thermal stability. Therefore, the anode material is suitable for use in lithium ion secondary batteries having a relatively high capacity, such as those for electric vehicles, power tools and electric power storage. In particular, in electric vehicles (EV), hybrid electric vehicles (HEV) and plug-in hybrid electric cars (PHEV), there is demand for carrying out charge and discharge with a large electric current in order to improve acceleration performance and regeneration performance of a brake. In order to satisfy the demand, the anode material of the invention, which exerts a high input-output performance, is desirable.

In particular, the anode material is preferably an anode material that includes a carbon material that satisfies a suitable combination of the above-mentioned characteristics, from the viewpoints of energy density, input-output characteristics, lifetime characteristics and thermal stability. Examples of the combination of the characteristics include the following (a) to (c). In each combination, it is more preferable that there are two exothermic peaks.

(a) An anode material for a lithium ion secondary battery that includes a carbon material having an average interlayer spacing d$_{002}$ as determined from X-ray diffraction of from 0.335 nm to 0.340 nm, a volume average particle diameter (50% D) of from 1 μm to 40 μm, a maximum particle diameter D$_{max}$ of 74 μm or less, and at least two exothermic peaks in a temperature range of from 300° C. to 1,000° C. in a differential thermal analysis in an air stream, wherein the at least two exothermic peaks include an exothermic peak having a peak in a temperature range of from 300° C. to less than 700° C. and an exothermic peak having a peak in a temperature range of from 700° C. to 1,000° C., and the carbon material further has a specific surface area as determined by nitrogen adsorption measurement at 77 K of from 0.5 m$^2$/g to 25 m$^2$/g and/or an adsorption amount as determined from carbon dioxide adsorption measurement at 273 K of from 0.1 cm$^3$/g to 5.0 cm$^3$/g.

From the viewpoints of energy density, input-output characteristics, lifetime characteristics and thermal stability, it is more preferred that the anode material for a lithium ion secondary battery has a volume average particle diameter (50% D) of from 5 μm to 25 μm, a maximum particle diameter D$_{max}$ of from 30 μm to 45 μm, a specific surface area as determined by nitrogen adsorption measurement at 77 K of from 0.8 m$^2$/g to 10 m$^2$/g, and an adsorption amount as determined by carbon dioxide adsorption measurement at 273K of from 0.1 cm$^3$/g to 3.0 cm$^3$/g.

(b) An anode material for a lithium ion secondary battery that includes a carbon material having an average interlayer spacing d$_{002}$ as determined from X-ray diffraction of from 0.335 nm to 0.340 nm, a volume average particle diameter (50% D) of from 1 μm to 40 μm, a maximum particle diameter D$_{max}$ of 74 μm or less, and at least two exothermic peaks in a temperature range of from 300° C. to 1,000° C. in a differential thermal analysis in an air stream, wherein the difference in peak temperature between an exothermic peak having a peak at the highest temperature and an exothermic peak having a peak at the lowest temperature among the at least two exothermic peaks is 300° C. or less, and the carbon material further has a specific surface area as determined by nitrogen adsorption measurement at 77 K of from 0.5 m$^2$/g to 25 m$^2$/g and/or an adsorption amount as determined from carbon dioxide adsorption measurement at 273 K of from 0.1 cm$^3$/g to 5.0 cm$^3$/g.

From the viewpoints of energy density, input-output characteristics, lifetime characteristics and thermal stability, it is more preferred that the anode material for a lithium ion secondary battery has a volume average particle diameter (50% D) of from 5 μm to 25 μm, a maximum particle diameter D$_{max}$ of 45 μm or less, a specific surface area as determined by nitrogen adsorption measurement at 77 K of from 0.8 m$^2$/g to 10 m$^2$/g, and an adsorption amount as determined by carbon dioxide adsorption measurement at 273K of from 0.1 cm$^3$/g to 3.0 cm$^3$/g.

Further, from the viewpoints of energy density, input-output characteristics, lifetime characteristics and thermal stability, it is more preferred that the anode material for a lithium ion secondary battery has a difference in peak temperature between an exothermic peak having a peak at the highest temperature and an exothermic peak having a peak at the lowest temperature from among the at least two exothermic peaks of 180° C. or less, a volume average particle diameter (50% D) of from 5 μm to 25 μm, a maximum particle diameter D$_{max}$ of 45 μm or less, a specific surface area as determined by nitrogen adsorption measurement at 77 K of from 0.8 m$^2$/g to 10 m$^2$/g, and an adsorption amount as determined by carbon dioxide adsorption measurement at 273K of from 0.1 cm$^3$/g to 3.0 cm$^3$/g.

(c) An anode material for a lithium ion secondary battery that includes a carbon material having an average interlayer spacing d$_{002}$ as determined from X-ray diffraction of from 0.335 nm to 0.340 nm, a volume average particle diameter (50% D) of from 1 μm to 40 μm, a maximum particle diameter D$_{max}$ of 74 μm or less, and at least two exothermic peaks in a temperature range of from 300° C. to 1,000° C. in a differential thermal analysis in an air stream, wherein the at least two exothermic peaks include an exothermic peak having a peak within a temperature range of from 300° C. to less than 700° C. and an exothermic peak having a peak within a temperature range of from 700° C. to 1,000° C., in which the difference in peak temperature between an exothermic peak having a peak at the highest temperature and an exothermic peak having a peak at the lowest temperature among the at least two exothermic peaks is 300° C. or less, and has a specific surface area as determined by nitrogen adsorption measurement at 77 K of from 0.5 m²/g to 25 m²/g and/or an adsorption amount as determined from carbon dioxide adsorption measurement at 273 K of from 0.1 cm³/g to 5.0 cm³/g.

From the viewpoints of energy density, input-output characteristics, lifetime characteristics and thermal stability, it is more preferred that the anode material for a lithium ion secondary battery has a volume average particle diameter (50% D) of from 5 μm to 25 μm, a maximum particle diameter $D_{max}$ of 45 μm or less, a specific surface area as determined by nitrogen adsorption measurement at 77 K of from 0.8 m²/g to 10 m²/g, and an adsorption amount as determined by carbon dioxide adsorption measurement at 273K of from 0.1 cm³/g to 3.0 cm³/g.

From the viewpoints of energy density, input-output characteristics, lifetime characteristics and thermal stability, it is more preferred that the anode material for a lithium ion secondary battery has a difference in peak temperature between an exothermic peak having a peak at the highest temperature and an exothermic peak having a peak at the lowest temperature among the at least two exothermic peaks of 180° C. or less, a volume average particle diameter (50% D) of from 5 μm to 25 μm, a maximum particle diameter $D_{max}$ of 45 μm or less, a specific surface area as determined by nitrogen adsorption measurement at 77 K of from 0.8 m²/g to 10 m²/g, and an adsorption amount as determined by carbon dioxide adsorption measurement at 273K of from 0.1 cm³/g to 3.0 cm³/g.

The carbon material included in the anode material may be of any type or form, as long as it includes a carbon material that exhibits the above-described characteristics.

Examples of the carbon material include graphite (for example, synthetic graphite, natural graphite, graphitized mesophase carbon, graphitized carbon fibers, etc.), low-crystalline carbon and mesophase carbon. From the viewpoint of readily increasing the charge-discharge capacity, the carbon material is preferably graphite. The graphite may have any form of scales, spheres or lumps. Among them, spherical graphite is preferable from the viewpoint of obtaining a high tapped density. A carbon material having the characteristics described above may be selected, as appropriate, from these carbon materials. These carbon materials may be used singly, or in combination of two or more thereof.

The carbon material may be a composite material composed of a carbon phase that forms a core and another type of carbon phase that forms a layer that covers the core. In other words, the carbon material may include a first carbon phase that forms a core, and a second carbon phase that is present on the surface of the first carbon phase and has a lower crystallinity than the first carbon phase. By forming a carbon material from carbon phases that differ in crystallinity, a carbon material that can effectively exert desired characteristics or properties can be obtained.

Examples of the first carbon phase that forms a core include the carbon materials as described above (for example, synthetic graphite, natural graphite, graphitized mesophase carbon and graphitized carbon fibers).

The second carbon phase is not particularly limited as long as it has a lower crystallinity than the first carbon phase, and may be appropriately selected in accordance with the desired properties. The second carbon phase is preferably a carbon phase obtained from an organic compound capable of leaving a carbonaceous substance after a thermal treatment (carbon precursor), and examples thereof include ethylene heavy end pitch, petroleum pitch, coal-tar pitch, asphalt decomposition pitch, pitch generated by thermal decomposition of polyvinyl chloride or the like, and synthetic pitch produced by polymerization of naphthalene or the like in the presence of a superacid. It is also possible to use, as a thermoplastic polymer compound, thermoplastic synthetic resin such as polyvinyl chloride, polyvinyl alcohol, polyvinyl acetate and polyvinyl butyral. It is also possible to use a natural product such as starch or cellulose.

In the carbon material in the anode material, it is preferred that one of the at least two exothermic peaks is derived from the first carbon phase and the other is derived from the second carbon phase, since the properties as mentioned above can be readily adjusted and an anode having a high energy density, excellent input-output characteristics, excellent lifetime characteristics and excellent thermal stability can be prepared with higher reliability.

In the carbon material that includes a first carbon phase and a second carbon phase, the content of the second carbon phase is not particularly limited as long as the carbon material as a whole exhibits the characteristics as described above. In a case in which one of the at least two exothermic peaks is derived from the first carbon phase and the other is derived from the second carbon phase, the content of the second carbon phase with respect to the mass of the total carbon material is preferably from 0.1% by mass to 30% by mass, preferably from 0.5% by mass to 15% by mass, and preferably from 1% by mass to 10% by mass.

The content ratio of the second carbon phase with respect to the mass of the total carbon material can be obtained by preliminary measuring, by thermogravimetric analysis or the like, a carbon residual ratio after carrying out a heat treatment of an organic compound as the carbon source (carbon precursor) alone and a carbon residual ratio after carrying out a heat treatment of a mixture of the organic compound and a first carbon phase at a predetermined mixing ratio, and calculating the mass of the second carbon phase from the product of the amount of carbon source that has been used for the preparation and the carbon residual ratio. When the content ratio of the second carbon phase is 0.1% by mass or higher, the input-output characteristics tend to be improved. When the content ratio of the second carbon phase is 30% by mass or lower, a lowering of capacity due to a low-crystalline component tends to be suppressed.

The second carbon phase may form a layer that covers the entire surface of the first carbon source, or may exist partially on the surface of the anode material. In the specification, the layer that is formed from the second carbon phase and covers the entire surface of the first carbon phase or a part of the surface of the first carbon phase is referred to as a "low-crystalline carbon layer".

It is preferable that there is a surface functional group including oxygen, such as C—O, C=O, C—OH or C—OOH, on the low-crystalline carbon layer. The amount of oxygen in the functional group can be determined by X-ray photoelectron spectroscopy (XPS). The amount of oxygen in the anode material relates to the amount of the second carbon phase, i.e., the amount of low-crystalline carbon. In a case in which there is a low-crystalline carbon layer on the surface in an amount of from 0.1% by mass to 30% by mass as described above, the proportion of the total oxygen amount in terms of the elemental composition is from 0.5 atom % to 5 atom %. Adjusting the oxygen amount to be within such a range is preferable from the viewpoint of exerting excellent input-output characteristics, excellent lifetime characteristics and excellent thermal stability of the anode.

One example of preferable embodiments of the anode material is a composite carbon material that includes a graphite material as a first carbon phase that forms a core and a low-crystalline carbon layer as a second carbon phase that is positioned on the surface of the graphite material.

The carbon material that forms a core is preferably a graphite material having an average interlayer spacing $d_{002}$ of from 0.335 nm to 0.340 nm, in view of increasing the charge-discharge capacity. It is preferable to use a graphite material in which $d_{002}$ is from 0.335 nm to 0.338 nm, especially from 0.335 nm to 0.337 nm, in terms of obtaining a large charge-discharge capacity of from 330 nAh/g to 370 mAh/g.

The volume average particle diameter (50% D) of the graphite material that forms a core is preferably from 1 μm to 40 μm. When the volume average particle diameter is 1 μm or more, an appropriate amount of fine powder is contained in a graphite raw material, and occurrence of aggregation during the process of attaching an organic compound to the core material is suppressed. As a result, the low-crystalline carbon and the crystalline carbon tend to become uniform. When the volume average particle diameter is 40 μm or less, inclusion of coarse particles in the final anode material is decreased, and formation of streaks or the like during formation of an anode is suppressed.

The specific surface area as determined by nitrogen adsorption measurement at 77K, i.e., the BET specific surface area ($N_2$ specific surface area), of the graphite material for the core is preferably from 0.1 m$^2$/g to 30 m$^2$/g, more preferably from 0.5 m$^2$/g to 25 m$^2$/g, and particularly preferably from 0.5 m$^2$/g to 15 m$^2$/g. When the $N_2$ specific surface area is 0.1 m$^2$/g or more, aggregation during the process of attaching the organic compound to the core material tends to be suppressed. When the $N_2$ specific surface area is 30 m$^2$/g or less, the specific surface area tends to be maintained within an appropriate range, and uniform attachment of the organic compound tends to be readily carried out.

When the $N_2$ specific surface area is excessively large, a combustion reaction is promoted and an exothermal peak tends to shift from the higher temperature side to the lower temperature side in differential thermal analysis (DTA), thereby deviating from the range of from 700° C. to 1,000° C. Therefore, the $N_2$ specific ratio is preferably within a range of from 0.1 m$^2$/g to 30 m$^2$/g since the organic compound can readily be attached to the core material. In particular, the $N_2$ specific surface area is more preferably within a range of from 0.5 m$^2$/g to 15 m$^2$/g since the organic compound is uniformly attached to the core material.

The shape of the graphite material for forming the core may be, for example, scale-shaped, spherical, lump-shaped, or the like. Among them, graphite having a spherical shape is preferable from the viewpoint of obtaining a high tapped density. An aspect ratio is an index that indicates sphericity (which represents a ratio of length that is orthogonal to a maximum length with respect to the maximum length, and the maximum value of the aspect ratio is 1). An average aspect ratio can be obtained with a flow-system particle image analyzer FPIA-3000, manufactured by SYSMEX Corporation.

The average aspect ratio of the graphite material for forming the core is preferably 0.1 or higher, more preferably 0.3 or higher. When the average aspect ratio is 0.1 or higher, the proportion of scale-shaped graphite is not too high, i.e., the graphite edge face can be within an appropriate range. Since the edge face is more active compared to the basal face, there is fear that the organic compound may selectively adhere to the edge face during a process of attaching the organic compound to the core material. However, when the average aspect ratio is within the above-described range, there is a tendency that low-crystalline carbon is evenly dispersed. When the average aspect ratio is 0.1 or higher, more preferably 0.3 or higher, the organic compound uniformly adheres to the core material. As a result, low-crystalline carbon and crystalline carbon are uniformly distributed in the anode material of the invention.

With a view to increasing the capacity, the anode material of the invention may include, in addition to the carbon material, a metal powder that forms an alloy with lithium, such as Al, Si, Ga, Ge, In, Sn or Ag; a multi-component alloy powder that includes at least an element that forms an alloy with lithium such as Al, Si, Ga, Ge, In, Sn, Sb or Ag; a lithium alloy powder, or the like. These components may be added singly or in the form of a composite material with the above-described carbon material. By adding such a metal powder or a composite material in the anode material, it is possible to obtain a greater tapped density than that obtained with the carbon material alone. In that case, the tapped density of the whole anode material falls within a range of from 0.3 g/cm$^3$ to 3.0 g/cm$^3$, whereby charge and discharge reactions are promoted, the anode resistance is reduced, and favorable input-output characteristics are obtained. The amount of the metal powder or the composite material is not particularly limited, and may be in an amount of from 1 to 50% by mass of the total amount of the anode material, for example.

<Method for Producing Anode Material>

The method for producing the anode material is not particularly limited, and may be any known method that is commonly employed.

In a case of an anode material that is a carbon material including the first carbon phase and the second carbon phase, in which one of the at least two exothermic peaks is derived from the first carbon phase and the other is derived from the second carbon phase, for example, the anode material having the features of each phase can be obtained by modifying the surface of the first carbon phase as the core to form a low-crystalline carbon layer of the second carbon phase.

A method for forming the low-crystalline carbon layer may be, for example, attaching an organic compound that leaves a carbonaceous material after thermal treatment (carbon precursor) to the surface of the first carbon phase, and carrying out sintering and carbonization in an inactive atmosphere at 750° C. to 1,000° C.

Examples of the organic compound that leaves a carbonaceous material after heat treatment that can form the second carbon phase (carbon precursor) may be the same as the examples as mentioned above.

The method for attaching the organic compound to the surface of the first carbon phase is not particularly limited, and examples thereof include a wet method in which carbon particles (carbon powder) that forms a core are dispersed and mixed with a solution prepared by dissolving or dispersing the organic compound in a solvent, and then removing the solvent; a dry method in which carbon particles and the organic compound are mixed in the form of a solid, respectively, and a mechanical energy is applied thereto to allow the organic compound to attach to the carbon particles; and a vapor-phase method such as a CVD method. From the viewpoint of controlling the specific surface area, the attachment is preferably carried out by a dry method.

The dry method for attaching the organic compound to the surface of the first carbon phase is not particularly limited, but may be a method in which, for example, a mixture of the first carbon particles and the organic compound (carbon precursor) is placed in a container and mixed to form a composite of the materials. As the container having a structure that allows mixing and/or agitation, for example, a container having a blade or a screw is preferably used. The mechanical energy to be applied to the mixture is preferably from 0.360 kJ/kg to 36,000 kJ/kg per kg of the mixture, more preferably from 0.360 kJ/kg to 7,200 kJ/kg per kg of the mixture, still more preferably from 2.50 kJ/kg to 2,000 kJ/kg per kg of the mixture.

The mechanical energy to be applied to the mixture is represented by a quotient obtained by dividing the product of load (kW) and time (h) by the mass of the mixture (kg). By applying a mechanical energy of the above-described range to the mixture, the carbon particles and the organic compound can be uniformly dispersed, and low-crystalline carbon and crystalline carbon can be distributed in a uniform manner in the anode material after sintering. As a result, the temperature difference between the two DTA exothermic peaks can be decreased.

The anode material can be prepared by heating and sintering an intermediate product obtained by attaching an organic compound, which can form the second carbon phase, to the surface of the first carbon phase. The sintering temperature is preferably from 750° C. to 2,000° C., more preferably from 800° C. to 1,800° C., and most preferably from 900° C. to 1,400° C. In a case in which the sintering temperature is 750° C. or higher, favorable charge-discharge efficiency, input-output characteristics and cycle characteristics of the obtained battery tend to be maintained. In a case in which the sintering temperature is 2,000° C. or lower, an excessive increase in crystallinity of the low-crystalline carbon portion tends to be suppressed. In addition, detection of two DTA exothermic peaks having a temperature difference of 25° C. or more or a DTA exothermic peak that appears at from 300° C. to less than 700° C. tends to be ensured. As a result, rapid charging characteristics, low temperature charging characteristics, safety in case of overcharge, etc. tend to be maintained favorable. The atmosphere during sintering is not particularly limited as long as oxidization of the anode material is difficult to occur, and examples include a nitrogen gas atmosphere, an argon gas atmosphere, and a self-decomposing gas atmosphere. The type of the furnace to be employed is not particularly limited, and preferred examples include a batch furnace or a continuous furnace in which electricity or gas is used as a heat source.

The two DTA exothermic peaks of the anode material for a lithium ion secondary battery can be appropriately controlled also with the sintering temperature. By increasing the sintering temperature, the peak temperature of the DTA exothermic peak that appears at from 300° C. to less than 700° C. can be shifted to the higher temperature side within the low temperature region.

In a case of using plural carbon materials that differ in crystallinity, the peak temperature of a DTA exothermic peak that appears at from 300° C. to less than 700° C. can be shifted to the higher temperature side within the range of the low temperature region by increasing the amount of low-crystalline carbon. Further, by increasing the sintering temperature in addition to increasing the amount of low-crystalline carbon, the peak temperature of a DTA exothermic peak that appears at from 300° C. to less than 700° C. can be shifted to the higher temperature side within the range of the low temperature region, and simultaneously, the peak temperature of a DTA exothermic peak that appears at from 700° C. to 1,000° C. can be shifted to the lower temperature side within the range of the high temperature region. Thus, the respective DTA exothermic peak temperatures and the difference between the two DTA exothermic peak temperatures can be controlled.

<Anode for Lithium Ion Secondary Battery>

The anode for a lithium ion secondary battery includes an anode material layer including the anode material for a lithium ion secondary battery, and a current collector. With this configuration, it is possible to produce a lithium ion secondary battery having a high energy density, excellent input-output characteristics, excellent lifetime characteristics and excellent thermal stability. The anode for a lithium ion secondary battery may include, as necessary, other structural elements in addition to the anode material layer that includes the anode material and the current collector.

The anode for a lithium ion secondary battery can be obtained by, for example, kneading the anode material for a lithium ion secondary battery and an organic binder with a solvent with a dispersing machine such as an agitator, a ball mill, a super sand mill or a pressure kneader to prepare an anode material slurry, and applying the same onto a current collector to form an anode layer. Alternatively, the anode layer can be obtained by shaping a paste-like anode material slurry into a sheet, pellets or the like, and integrating the same with a current collector.

The organic binder is not particularly limited. Examples thereof include a styrene-butadiene copolymer, ethylenic unsaturated carboxylic acid esters such as methyl (meth)acrylate, ethyl (meth)acrylate, butyl (meth)acrylate, (meth)acrylonitrile and hydroxyethyl (meth)acrylate, ethylenic unsaturated carboxylic acids such as acrylic acid, methacrylic acid, itaconic acid, fumaric acid and maleic acid, and highly ion-conductive polymers such as polyvinylidene fluoride, polyethylene oxide, polyepichlorohydrin, polyphosphazene and polyacrylonitrile. The content of the organic binder is preferably from 0.5 parts by mass to 20 parts by mass, provided that the total of the organic binder and the anode material for a lithium ion secondary battery of the invention is 100 parts by mass.

A thickener may be added to the anode material slurry for adjusting the viscosity. Examples of the thickener include carboxymethylcellulose, methylcellulose, hydroxymethylcellulose, ethylcellulose, polyvinyl alcohol, polyacrylic acid (salt), oxidized starch, phosphorylated starch and casein.

A conductive additive may be mixed in the anode material slurry. Examples of the conductive additive include carbon black, graphite, acetylene black, and oxides or nitrides that exhibit conductivity. The amount of the conductive additive may be from 0.5% by mass to 15% by mass of the anode material of the invention.

The material and the shape of the current collector are not particularly limited. For example, a strip-shaped foil, punched foil, mesh or the like made of aluminum, copper, nickel, titanium, stainless steel or the like may be used. Porous materials, such as porous metal (foamed metal foam) or carbon paper, may also be used.

The method for applying the anode material slurry onto the current collector is not particularly limited, and examples thereof include known methods such as a metal mask printing method, an electrostatic coating method, a dip coating method, a spray coating method, a roll coating method, a doctor blade method, a comma coating method, a gravure coating method and a screen printing method. After the application, the solvent contained in the anode material slurry is removed by drying with a hot air dryer, an infrared dryer or a combination thereof. Further, as necessary, a flatting treatment is carried out with a flat plate, a calender roll or the like. The integration of the anode layer having the shape of a sheet, pellets or the like and the current collector can be carried out by a known method such as rolling, pressing or a combination thereof. The pressure applied for the integration is preferably from 1 MPa to 200 MPa.

The anode density of the anode material for a lithium ion secondary battery according to the invention is preferably from 1.3 g/cm$^3$ to 1.8 g/cm$^3$, more preferably from 1.4 g/cm$^3$ to 1.7 g/cm$^3$, and particularly preferably from 1.4 g/cm$^3$ to 1.6 g/cm$^3$. When the anode density is 1.3 g/cm$^3$ or higher, there is a tendency that the capacity can be increased without lowering the resistance. When the anode density is 1.8 g/cm$^3$ or lower, there is a tendency that a decrease in rate characteristics and cycle characteristics can be suppressed.

<Lithium Ion Secondary Battery>

The lithium ion secondary battery according to the invention includes the anode for a lithium ion secondary battery as described above, a cathode and an electrolyte. For example, the lithium ion secondary battery can be obtained by disposing the anode for a lithium ion secondary battery and the cathode such that the anode and the cathode face each other with a separator disposed therebetween, and injecting an electrolyte solution therein.

The cathode can be obtained by forming a cathode layer on the surface of a current collector, in a manner similar to the formation of the anode. The current collector may be a strip-shaped foil, punched foil, mesh or the like made of a metal or an alloy such as aluminum, titanium or stainless steel.

The cathode material used in the cathode layer is not particularly limited, and a metal compound, a metal oxide, a metal sulfide or a conductive polymer material, each of which allows doping or intercalation of lithium ions, may be used. Examples of the cathode material include lithium cobaltate (LiCoO$_2$), lithium nickelate (LiNiO$_2$), lithium manganate (LiMnO$_2$), a complex oxide thereof (LiCo$_x$Ni$_y$Mn$_z$O$_2$, x+y+z=1), a complex oxide further containing an additional element M' (LiCo$_a$Ni$_b$Mn$_c$M'$_d$O$_2$, a+b+c+d=1, M': Al, Mg, Ti, Zr or Ge), lithium manganese spinel (LiMn$_2$O$_4$), a lithium vanadium compound, V$_2$O$_5$, V$_6$O$_{13}$, VO$_2$, MnO$_2$, TiO$_2$, MoV$_2$O$_8$, TiS$_2$, V$_2$S$_5$, VS$_2$, MoS$_2$, MoS$_3$, Cr$_3$O$_8$, Cr$_2$O$_5$, olivin LiMPO$_4$(M:Co, Ni, Mn, Fe), conductive polymers such as polyacetylene, polyaniline, polypyrrole, polythiophene and polyacene, and porous carbon. These materials may be used singly or as a mixture.

As the separator, for example, a non-woven fabric, a cloth or a micropore film, each of which is mainly composed of polyolefin such as polyethylene or polypropylene, or a combination thereof may be used. In a case in which the lithium ion secondary battery has a structure in which the cathode and the anode do not contact each other, it is not necessary to use a separator.

As the electrolyte solution, a so-called organic electrolyte solution may be used. The organic electrolyte solution obtained by dissolving a lithium salt such as LiClO$_4$, LiPF$_6$, LiAsF$_6$, LiBF$_4$ or LiSO$_3$CF$_3$ in a non-aqueous solvent selected from ethylene carbonate, fluoroethylene carbonate, chloroethylene carbonate, propylene carbonate, butylene carbonate, vinylene carbonate, cyclopentanone, cyclohexylbenzene, sulfolane, propane sultone, 3-methylsulfolane, 2,4-dimethylsulfolan, 3-methyl-1,3-oxazolidin-2-one, γ-butyrolactone, dimethyl carbonate, diethyl carbonate, ethyl methyl carbonate, methyl propyl carbonate, butyl methyl carbonate, ethyl propyl carbonate, butyl ethyl carbonate, dipropyl carbonate, 1,2-dimethoxyethane, tetrahydrofuran, 2-methyltetrahydrofuran, 1,3-dioxolan, methyl acetate, ethyl acetate, trimethyl phosphate, triethyl phosphate, etc., or a mixture of two or more thereof.

The structure of the lithium ion secondary battery is not particularly limited. Generally, the lithium ion secondary battery has a structure in which a cathode, an anode and an optional separator are folded to form a flat, rolled-up polar plate group, or a structure in which plural cathodes, plural anodes and plural separators are layered to form a layered polar plate group, and the polar plate group is sealed in an outer package.

The lithium ion secondary battery may be used as a laminated battery, a paper battery, a button buttery, a coin battery, a stacked battery, a cylindrical battery, a rectangular battery or the like. However, the lithium ion secondary battery is not limited to these applications.

In addition to having excellent input-output characteristics for charge and discharge, excellent lifetime characteristics and excellent thermal stability, the anode material has advantages in that production of a battery is easy because of rapid penetration of an electrolyte solution, an increase in expansion of an anode caused by repeated charge-discharge cycles is small, and an increase in pressure due to generation of a gas within the battery is small. Therefore, the anode material of the invention is suitably used in a lithium ion secondary battery having a thin shape, such as a laminated battery, a paper battery, a stacked battery or a rectangular battery, which is relatively difficult in injecting an electrolyte solution or easy to expand as a result of charging and discharging.

Although it is merely a presumption, it is considered that permeability is improved by an increase in affinity of the anode material with an electrolyte solution caused by a chemical or electrostatic effect of oxygen-containing surface functional groups such as C—O, C=O, C—OH or C—OOH that may be included in the carbon material that exhibits an exothermic peak having a lower peak temperature among the at least two exothermic peaks of the anode material. As a result, the current distribution or the reaction distribution of the charge and discharge reactions of the anode are reduced, thereby suppressing expansion of the anode or generation of a gas.

In a case in which the battery size of a thin lithium ion secondary battery is increased, it is preferable to use the anode material of the invention from the viewpoint of carrying out injection of an electrolyte solution uniformly and rapidly, thereby suppressing expansion of the battery. Specifically, the battery capacity is preferably 3.5 Ah or more, more preferably 5 Ah or more, particularly preferably 10 Ah or more.

In a thin lithium ion secondary battery having a battery size represented by length (a)×width (b)×thickness (c), when thickness (c) is preferably ½ or less than the shorter one of length (a) or width (b), more preferably ¼ or less, particularly 1/10 or less, i.e., the lithium ion secondary battery has a flatter and thinner shape, the negative effect of expansion of the anode due to charge-discharge cycles is relatively significant. Therefore, the anode material of the invention is suitable for such a battery.

The lithium ion secondary battery according to the invention exhibits excellent input-output characteristics, excellent lifetime characteristics and excellent thermal stability, as compared to lithium ion secondary batteries in which conventional carbon materials are employed for the anode. In particular, a thin lithium ion secondary battery in which the anode material as described above is used is high in input-output performances and low in expansion, and is advantageous in terms of installation or cooling properties in the form of an assembled battery including plural batteries.

Therefore, the lithium ion secondary battery according to the invention, especially the thin lithium ion secondary battery, is suitable for use in electric vehicles, power tools, etc., especially in electric vehicles (EV), hybrid electric vehicles (HEV) and plug-in hybrid electric vehicles (PHEV).

EXAMPLES

Hereinafter, the invention is described more specifically with reference to the examples. However, the invention is not limited to the examples provided below.

Example 1

(Preparation of Anode Material)

100 parts by mass of spherical natural graphite having an average particle diameter of 10 μm ($d_{002}$=0.336 nm, average aspect ratio=0.7) and 10 parts by mass of coal tar pitch (softening point: 98° C., carbon residual ratio (carbonization ratio):50%) were mixed. The mixture was sealed in an apparatus provided with a rotation blade in a cylinder that performs kneading of the materials placed between the inner wall of the cylinder and the rotation blade to produce a composite of the materials. A pitch-graphite composite was prepared by operating the apparatus for 5 minutes under load of 24 kW (load: 1,800 kJ/kg). Then, under a nitrogen stream, the temperature was increased to 900° C. at a temperature increase rate of 20° C./h and maintained for 1 hour, thereby obtaining carbon layer-coated graphite particles. The carbon layer-coated graphite particles were deflocculated with a cutter mill, and sieved with a 300-mesh sieve, and particles that passed through the sieve were used as an anode material for Example 1. The anode material was subjected to XRD analysis, Raman spectroscopic analysis, specific surface area measurement, volume average particle diameter (50% D) measurement and maximum diameter $D_{max}$ measurement, according to the following methods. The characteristics identified are shown in Table 1.

[XRD Analysis (Measurement of Average Interlayer Spacing $d_{002}$)]

The anode material sample was stuffed in a recess portion of a quartz sample holder, and the sample holder was set to a measurement stage. Measurement was carried out with a wide-angle X-ray diffraction instrument (manufactured by Rigaku Corporation) under the following measurement conditions.

Radiation source: CuKα ray (wavelength=0.15418 nm)
Output: 40 kV, 20 mA
Sampling width: 0.010°
Scanning range: from 10° to 35°
Scanning speed: 0.5°/min

[Measurement of Volume Average Particle Diameter (50% D)]

A solution obtained by dispersing the anode material sample and a surfactant in purified water was placed in a sample tank of a laser diffraction particle size distribution analyzer SALD-3000J (manufactured by Shimadzu Corporation), and measurement was carried out by laser diffraction while the solution was ultrasonicated and circulated with a pump. The volume cumulative 50% particle diameter (50% D) of the particle size distribution obtained was defined as the average particle diameter.

[Measurement of Maximum Particle Diameter $D_{max}$]

The anode material sample was classified with a sieve, and the presence or absence of the sample remaining on the sieve was observed. The aperture of the sieve was changed in the order of 90 μm, 74 μm, 63 μm, 53 μm, 45 μm and 38 μm, and the aperture of the sieve that was used immediately before the sieve on which the sample remained was defined as the maximum particle diameter $D_{max}$.

[Differential Calorimetry]

Measurement was carried out with a simultaneous differential calorimetry—thermogravimetry analyzer EXSTAR TG/DTA6200 (manufactured by Seiko Instruments Inc.) under the following measurement conditions.

Reference sample: α-alumina
Temperature range: from 30° C. to 1,000° C.
Temperature increase rate: 2.5° C./min. (20° C./min. in a range of from 30° C. to 300° C.)
Atmosphere and flow rate: dry air, 300 ml/min.

[Measurement of $N_2$ Specific Surface Area]

The $N_2$ Specific Surface Area was calculated according to the BET method (relative pressure range: from 0.05 to 0.2) by measuring nitrogen adsorption at a liquid nitrogen temperature (77 K) by a multipoint method with a high-speed specific surface area/pore distribution measurement instrument ASAP2010 (manufactured by MICRO MERITICS).

[Measurement of $CO_2$ Adsorption Amount]

The $CO_2$ adsorption amount at 243 K as measured at a relative pressure $P/P_0$=3.0×10$^{-2}$ with a full-automatic gas adsorption amount measurement instrument AUTOSORB-1 (manufactured by Quantachrome) was used (P=equilibrium pressure, $P_0$=26,142 mmHg).

[Measurement of Tapped Density]

100 cm$^3$ of the sample powder was slowly placed into a 100 cm$^3$-volume graduated cylinder, and the graduated cylinder was sealed. After dropping the graduated cylinder from a height of 5 cm 250 times, the weight and the volume of the sample powder were measured and a value calculated therefrom was defined as the tapped density.

[Measurement of R Value (Raman Spectroscopic Analysis)]

Measurement was carried out with a Raman spectrometer NRS-1000 (manufactured by JASCO Corporation; excitation wavelength: 532 nm). The R value was obtained as Id/Ig, which is a ratio of the peak height (Id) derived from the D band and the peak height (Ig) derived from the G band, using the entire measurement range (from 830 cm$^{-1}$ to 1,940 cm$^{-1}$) as the base line.

[Average Aspect Ratio]

An average aspect ratio (an aspect ratio represents a ratio of a length orthogonal to a maximum length with respect to the maximum length, and the maximum value of the aspect ratio is 1) was obtained with a flow-system particle image analyzer (FPIA-3000 manufactured by SYSMEX Corporation).

(Measurement of Initial Charge-Discharge Efficiency)

An aqueous solution containing CMC (carboxymethylcellulose, CELLOGEN WS-C manufactured by Dai-ichi Kogyo Seiyaku Co., Ltd.) as a thickener at a concentration of 2% by mass was added to 98 parts by mass of the anode material of the present example, such that the solid amount of CMC was 1 part by mass, and the mixture was kneaded for 10 minutes. Thereafter, purified water was added such that the total solid concentration of the anode material and the CMC was from 40% by mass to 50% by mass, and kneading was carried out for 10 minutes. Subsequently, an aqueous dispersion containing SBR (BM-400B manufactured by ZEON Corporation) as a binder at a concentration of 40% was added such that the solid amount of SBR was 1 part by mass, and the resultant was mixed for 10 minutes. A paste-like anode material slurry was thus prepared. The slurry was applied onto a 40 μm-thick electrolytic copper foil with a 200 μm-thick mask, such that the diameter of the applied slurry was 9.5 mm. Then, water was removed by drying at 105° C., thereby preparing a sample electrode (anode).

Then, the sample electrode, a separator and a counter electrode were stacked in this order, and an electrolyte solution obtained by dissolving $LiPF_6$ in a mixed solvent of ethylene carbonate (EC) and methyl ethyl carbonate (MEC) (the volume ratio of EC:MEC=1:3) such that the concentration of $LiPF_6$ is 1.5 mol/l was added thereto, thereby preparing a coin battery. Metal lithium was used as the counter electrode, and a 20 μm-thick polyethylene micropore film was used as the separator.

The coin battery was charged by applying a constant current of 0.2 $mA/cm^2$ until the voltage was 0V (V vs. $Li/Li^+$) between the sample electrode and the counter electrode of the coin battery. Then, the coin battery was charged at a constant voltage of 0V until the current was 0.02 mA. After a pause of 30 minutes, one cycle test in which the coin battery was discharged at a constant current of 0.2 $mA/cm^2$ until the voltage was 2.5 V (V vs. $Li/Li^+$), and the initial charge-discharge efficiency was measured. The initial charge-discharge efficiency was calculated as (discharge capacity)/(charge capacity)×100. In the calculation, a case in which lithium ions are absorbed in the sample electrode of the anode material is referred to as charging, and a case in which lithium ions are released from the sample electrode is referred to as discharging.

(Evaluation of Lifetime Characteristics)

The anode material slurry was prepared according to the same method as that of the section for the initial charge-discharge efficiency. The slurry was applied onto a 40 μm-thick electrolytic copper foil with a comma coater whose clearance was adjusted so that the coating amount per unit area was 4.5 $mg/cm^2$. Thereafter, the electrode density was adjusted to 1.5 $g/cm^3$ with a hand press. The electrode was punched into a disc shape with a diameter of 14 mm, thereby preparing a sample electrode (anode).

Then, the sample electrode, a separator and a counter electrode were stacked in this order, and an electrolyte solution obtained by dissolving $LiPF_6$ in a mixed solvent of ethylene carbonate (EC) and methyl ethyl carbonate (MEC) (the volume ratio of EC:MEC=1:3) such that the concentration of $LiPF_6$ is 1.5 mol/l was added thereto, thereby preparing a coin battery. Metal lithium was used as the counter electrode, and a 20 μm-thick polyethylene micropore film was used as the separator.

Evaluation of lifetime characteristics was carried out with the coin battery prepared above, according to the following procedures.

(1) The battery was charged at a constant current of 0.24 mA until the voltage was 0 V (V vs. $Li/Li^+$), and then charged at a constant voltage of 0 V until the current was 0.024 mA.

(2) After a pause of 30 minutes, one cycle test of discharging the battery at a constant current of 0.24 mA until the voltage was 1.5 V (V vs. $Li/Li^+$) was carried out to measure the discharge capacity.

(3) The battery was charged at a constant current of 2.4 mA until the voltage was 0 V (V vs. $Li/Li^+$), and the battery was charged at a constant voltage of 0 V until the current was 0.24 mA.

(4) After a pause of 30 minutes, the battery was discharged at a constant current of 2.4 mA until the voltage was 1.5 V (V vs. $Li/Li^+$).

(5) The charge-discharge cycle test including steps of (3) and (4) was carried out 50 cycles.

A discharge capacity retention rate after 50 cycles with respect to the first cycle (=discharge capacity in the 50th cycle/discharge capacity in the first cycle×100) was measured, and lifetime characteristics were evaluated. The higher the discharge retention rate is, the better the lifetime characteristics of the material are.

(Evaluation of Input-Output Characteristics)

A coin battery was prepared by a method equivalent to that employed in the evaluation of the lifetime characteristics, and output characteristics were evaluated according to the following procedures.

(1) The battery was charged at a constant current of 0.48 mA until the voltage was 0 V (V vs. $Li/Li^+$), and then charged at a constant voltage of 0 V until the current was 0.048 mA.

(2) After a pause of 30 minutes, the battery was discharged at a constant current of 0.48 mA until the voltage was 1.5 V (V vs. $Li/Li^+$).

(3) The battery was charged at a constant current of 0.48 mA to one-half of the capacity.

(4) The battery was discharged for 10 seconds at 2.4 mA, 7.2 mA and 12 mA, respectively, and a voltage reduction (ΔV) was measured at each test. A pause of 30 minutes was provided between the tests.

The values of ΔV were plotted in a graph with respect to the respective current values, and a slope obtained therefrom was defined as the value of resistance (Ω). The smaller the value is, the better the input-output characteristics of the battery are.

(Evaluation of Thermal Stability)

A coin battery was prepared according to a method equivalent to that employed in the evaluation of the lifetime characteristics, and thermal stability was evaluated according to the following procedures.

(1) The coin battery was charged at a constant current of 0.24 mA until the voltage was 0 V (V vs. $Li/Li^+$), and then charged at a constant voltage of 0 V until the current was 0.024 mA.

(2) The coin battery that was fully charged (SOC 100%) in (1) was disintegrated in an argon gas atmosphere, and the anode was taken out and washed with diethyl carbonate (DEC) and vacuum-dried for 30 minutes.

(3) The electrolytic copper foil and the anode material were separated from the anode after drying in (2), and the remaining anode material was charged in a SUS pan. As a reference, an aluminum pan in which only argon gas was charged was also prepared.

(4) The SUS pan for evaluation prepared in (3) was set in a differential scanning calorimeter EXSTAR DSC6200 (manufactured by SII Nano Technology Inc.), and the temperature was increased from 100° C. to 400° C. at a rate of 10° C./min., while introducing an argon gas at 50 ml/min.

It may be said that the higher the exothermic peak temperature is, the higher the safety (thermal stability) is.

Example 2

An anode material sample was prepared according to the same method as that employed in Example 1, except that the amount of coal tar pitch at the time of simple mixing was changed from 10 parts by mass to 5 parts by mass. The characteristics of the obtained anode material sample are shown in Table 1.

Example 3

An anode material sample was prepared according to the same method as that employed in Example 1, except that the average particle diameter of the spherical natural graphite was changed from 10 μm to 5 μm, and that the mesh size of the sieve was changed from 300 mesh to 400 mesh. The characteristics of the obtained anode material sample are shown in Table 1.

Example 4

An anode material sample was prepared according to the same method as that employed in Example 1, except that the carbon precursor to be mixed was changed from coal tar pitch to polyvinyl alcohol (polymerization degree: 1,700, fully-saponified, carbonization ratio: 15%), and that the mesh size of the sieve was changed from 300 mesh to 250 mesh. The characteristics of the obtained anode material sample are shown in Table 1.

Example 5

An anode material sample was prepared according to the same method as that employed in Example 1, except that the average particle diameter of the spherical natural graphite was changed from 10 μm to 20 μm, the amount of the coal tar pitch at the time of simple mixing was changed from 10 parts by mass to 20 parts by mass, the treatment time for obtain a composite in the cylinder was changed from 5 minutes to 10 seconds (load: 60 kJ/kg), and the mesh size of the sieve was changed from 300 mesh to 350 mesh. The characteristics of the obtained anode material sample are shown in Table 1.

Comparative Example 1

Green coke was produced by subjecting coal-derived coal tar to a thermal treatment at 400° C. in an autoclave. After crushing, the green coke was calcined at 1,200° C. in an inactive atmosphere, thereby obtaining coke agglomerates. The coke agglomerates were pulverized to an average particle diameter of 15 μm with an impact crusher equipped with a classifier. The carbon particles that passed through a 200-mesh sieve were used as an anode material sample ($d_{002}$=0.342 nm). The characteristics of the obtained anode material sample are shown in Table 1.

Comparative Example 2

100 parts by mass of the coke carbon particles having an average particle diameter of 15 μm, used in Comparative Example 1, and 20 parts by mass of polyvinyl alcohol (polymerization degree: 1,700, fully-saponified, carbonization ratio: 15%) were mixed. Carbon layer-coated graphite particles were prepared from the mixture in the same manner as Example 1. The carbon layer-coated carbon particles were deflocculated with a cutter mill, and sieved with a 350-mesh sieve. An anode material sample was prepared according to the same method as that employed in Example 1, except that the particles that passed through the 350-mesh sieve were used as the anode material. The characteristics of the obtained anode material sample are shown in Table 1.

Comparative Example 3

Scale-shaped graphite ($d_{002}$=0.337 nm, average aspect ratio=0.2) was sieved with a 200-mesh sieve, and the resultant was used as an anode material sample. The characteristics of the obtained anode material sample are shown in Table 1.

Comparative Example 4

Spherical natural graphite having an average particle diameter of 20 μm ($d_{002}$=0.336 nm, average aspect ratio=0.7) was sieved with a 300-mesh sieve, and the resultant was used as an anode material sample. The characteristics of the obtained anode material sample are shown in Table 1.

Comparative Example 5

The carbon particles prepared in Comparative Example 1 were placed in a graphite container, and graphitization was carried out by increasing the temperature to 2,800° C. at a temperature increase rate of 300° C./hr in a nitrogen gas atmosphere with an induction heating furnace, and maintaining the temperature for 1 hour. The obtained synthetic graphite powder was sieved with a 200-mesh sieve. An anode material was prepared according to the same method as that employed in Example 1, except that the synthetic graphite powder that passed the sieve was used as an anode material. The characteristics of the obtained anode material are shown in Table 1.

Example 6

An anode material was prepared according to the same method as that employed in Example 1, except that 100 parts by mass of the synthetic graphite powder obtained in Comparative Example 5 was mixed with 7 parts by mass of coal tar pitch used in Example 1. The characteristics of the obtained anode material sample are shown in Table 1.

Comparative Example 6

100 parts by mass of the carbon particles prepared in Comparative Example 1, 30 parts by mass of coal tar pitch and 5 parts by mass of iron oxide powder were mixed at 250° C. for 1 hour. The obtained agglomerates were crushed with a pin mill, and shaped into a block having a density of 1.52 g/cm³ with a mold press. The obtained block was sintered at a maximum temperature of 800° C. in a muffle furnace, and graphitized at 2,900° C. in a self-atmosphere in an Acheson furnace. Subsequently, the graphitized block was coarsely crushed with a hammer, and a graphite powder having an average particle diameter of 45 μm was obtained with a pin mill. Further, the graphite powder was treated with a spheronization processor (FACULTY, manufactured by Hosokawa Micron Corporation) for 10 minutes at a crushing rotation number of 1,800 rpm and a classification rotation number of 7,000 rpm, thereby producing a spheronized synthetic graphite powder. The characteristics of the powder as an anode material were evaluated according to the same method as that employed in Example 1. The results are shown in Table 1.

Example 7

100 parts by mass of the spheronized synthetic graphite powder obtained in Comparative Example 6 were mixed with 4 parts by mass of coal tar pitch used in Example 1, and an anode material was prepared according to the same method as that employed in Example 1 at a load of 2.5 kJ/kg. The characteristics of the obtained anode material are shown in Table 1.

Example 8

An anode material was prepared according to the same method as that employed in Example 7, except that the spheronized natural graphite of Example 5 was used and the sintering temperature was changed from 900° C. to 1,050° C. An anode material was prepared according to the same method as that employed in Example 1. The characteristics of the obtained anode material are shown in Table 1.

Example 9

An anode material was prepared according to the same method as that employed in Example 7, except that the spheronized natural graphite of Example 5 was used and the sintering temperature was changed from 900° C. to 820° C. An anode material was prepared in the same manner as in Example 1. The characteristics of the obtained anode material are shown in Table 1.

Example 10

An anode material was prepared according to the same method as that employed in Example 7, except that the spheronized natural graphite of Example 5 was used and the sintering temperature was changed from 900° C. to 777° C. An anode material was prepared according to the same method as that employed in Example 1. The characteristics of the anode material sample obtained are shown in Table 1.

As is clear from Table 1, the lithium ion secondary batteries in which the anode materials for a lithium ion secondary battery of Examples 1 to 10 were used exhibit excellent input-output characteristics, lifetime characteristics and thermal stability while maintaining a high charge-discharge efficiency.

In view of the above, a lithium ion secondary battery having an anode in which the anode material for a lithium ion secondary battery according to the invention is used exhibit excellent charge-discharge efficiency, lifetime characteristics, input-output characteristics and thermal stability, and have an excellent balance thereof.

The disclosure of Japanese Patent Application No. 2010-171912, filed Jul. 30, 2010, and the disclosure of Japanese Patent Application No. 2010-284422, filed Dec. 21, 2010, are incorporated herein by reference in their entirety.

All publications, patent applications, and technical standards mentioned in this specification are herein incorporated by reference to the same extent as if each individual publication, patent application, or technical standard was specifically and individually indicated to be incorporated by reference.

The invention claimed is:

1. An anode material for a lithium ion secondary battery, comprising a carbon material having an average interlayer spacing $d_{002}$ as determined by X-ray diffraction of from 0.335 nm to 0.338 nm, a volume average particle diameter (50% D) of from 1 μm to 40 μm, a maximum particle diameter $D_{max}$ of 74 μm or less, and at least two exothermic peaks that comprise an exothermic peak having a peak within a temperature range of from 300° C. to less than 700° C. and an exothermic peak having a peak within a temperature range of from 700° C. to 745° C.

2. The anode material for a lithium ion secondary battery according to claim 1, wherein the at least two exothermic peaks comprise an exothermic peak having a peak within a temperature range of from 500° C. to less than 700° C.

3. The anode material for a lithium ion secondary battery according to claim 1, wherein a difference in peak temperatures between an exothermic peak having a peak at a highest temperature from among the at least two exothermic peaks, and an exothermic peak having a peak at a lowest temperature from among the at least two exothermic peaks is 200° C. or less.

TABLE 1

| Item | Average Particle Diameter (μm) | Maximum Particle Diameter (μm) | $d_{002}$ (nm) | DTA Exothermic Peak Temperature (° C.) | $N_2$ Specific Surface Area (m²/g) | $CO_2$ Adsorption Amount (cm³/g) | Raman R Value | Tapped Density (g/cm³) | Initial Discharge Capacity (Ah/kg) | Initial Charge-Discharge Efficiency (%) | Input Output Characteristics (Resistance, Ω) | Discharge Capacity Ratio at 50th Cycle (%) | DSC Exothermic Peak Temperature (° C.) |
|---|---|---|---|---|---|---|---|---|---|---|---|---|---|
| Example 1 | 11 | 53 | 0.336 | 570.722 | 2.8 | 0.6 | 0.51 | 0.85 | 368 | 93 | 16 | 82 | 308 |
| Example 2 | 10 | 53 | 0.336 | 572.725 | 5.7 | 0.6 | 0.46 | 0.82 | 369 | 93 | 15 | 80 | 308 |
| Example 3 | 7 | 38 | 0.336 | 566.724 | 5.1 | 0.6 | 0.52 | 0.50 | 362 | 90 | 12 | 81 | 304 |
| Example 4 | 11 | 63 | 0.336 | 550.728 | 5.2 | 0.3 | 0.49 | 0.83 | 361 | 92 | 13 | 78 | 313 |
| Example 5 | 21 | 45 | 0.336 | 595.740 | 0.9 | 0.8 | 0.45 | 1.17 | 364 | 90 | 13 | 84 | 336 |
| Example 6 | 16 | 74 | 0.337 | 570.733 | 1.4 | 0.7 | 0.44 | 0.81 | 332 | 90 | 19 | 75 | 318 |
| Example 7 | 34 | 53 | 0.337 | 568.745 | 2.4 | 0.5 | 0.41 | 1.16 | 343 | 93 | 17 | 72 | 315 |
| Example 8 | 21 | 45 | 0.336 | 628.701 | 0.8 | 0.2 | 0.41 | 1.25 | 360 | 94 | 13 | 89 | 315 |
| Example 9 | 21 | 45 | 0.336 | 569.735 | 1.1 | 2.9 | 0.46 | 1.17 | 361 | 89 | 19 | 80 | 312 |
| Example 10 | 21 | 45 | 0.336 | 555.752 | 1.4 | 5.0 | 0.49 | 1.16 | 357 | 86 | 21 | 70 | 311 |
| Comp. Ex. 1 | 15 | 74 | 0.342 | 694 | 8.1 | 0.2 | 1.06 | 0.49 | 249 | 82 | 24 | 62 | 322 |
| Comp. Ex. 2 | 17 | 45 | 0.346 | 708 | 2.0 | 0.4 | 0.93 | 0.84 | 244 | 83 | 25 | 81 | 345 |
| Comp. Ex. 3 | 35 | 63 | 0.337 | 813 | 1.0 | 0.1 | 0.15 | 1.15 | 329 | 89 | 22 | 77 | 275 |
| Comp. Ex. 4 | 20 | 53 | 0.336 | 804 | 4.8 | 0.3 | 0.21 | 1.01 | 365 | 94 | 15 | 69 | 294 |
| Comp. Ex. 5 | 15 | 74 | 0.337 | 801 | 1.6 | 0.05 | 0.17 | 0.47 | 330 | 88 | 23 | 72 | 305 |
| Comp. Ex. 6 | 33 | 53 | 0.337 | 795 | 5.9 | 0.2 | 0.24 | 1.10 | 341 | 87 | 19 | 67 | 270 |

4. The anode material for a lithium ion secondary battery according to claim 1, wherein a specific surface area of the carbon material at 77 K as determined by nitrogen adsorption measurement is from 0.5 m²/g to 25 m²/g.

5. The anode material for a lithium ion secondary battery according to claim 1, wherein an R value obtained from a Raman spectroscopic analysis of the carbon material is from 0.10 to 1.5.

6. The anode material for a lithium ion secondary battery according to claim 1, wherein the carbon material comprises a first carbon phase that serves as a core, and a second carbon phase that is present on a surface of the first carbon phase and has a lower crystallinity than the first carbon phase.

7. The anode material for a lithium ion secondary battery according to claim 6, wherein a content ratio of the second carbon phase is from 0.1° A by mass to 30% by mass with respect to a total mass of the carbon material.

8. An anode for a lithium ion secondary battery, comprising: an anode material layer that includes the anode material for a lithium ion secondary battery of claim 1; and a current collector.

9. A lithium ion secondary battery comprising the anode for a lithium ion secondary battery of claim 8, a cathode and an electrolyte.

10. The anode material for a lithium ion secondary batter according to claim 1, wherein a tapped density of the carbon material is from 0.5 g/cm³ to 2.0 g/cm³.

11. The anode material for a lithium ion secondary batter according to claim 1, wherein a tapped density of the carbon material is from 0.5 g/cm³ to 1.3 g/cm³.

12. The anode material for a lithium ion secondary batter according to claim 1, wherein a tapped density of the carbon material is from 0.3 g/cm³ to 2.0 g/cm³.

13. The anode material for a lithium ion secondary batter according to claim 1, wherein an adsorption amount of the carbon material at 273 K as determined by carbon dioxide adsorption measurement is from 0.1 cm³/g to 5.0 cm³/g.

14. An anode material for a lithium ion secondary battery comprising:
a carbon material comprising:
a first carbon phase that serves as a core;
a second carbon phase that is present on a surface of the first carbon phase and has a lower crystallinity than the first carbon phase, wherein a content of the second carbon phase is from 0.1° A by mass to 30% by mass with respect to a total mass of the carbon material;
an average interlayer spacing $d_{002}$ as determined by X-ray diffraction from 0.335 nm to 0.338 nm;
a volume average particle diameter (50% D) from 1 μm to 40 μm;
a maximum particle diameter $D_{max}$ of 74 μm or less;
at least two exothermic peaks that comprise an exothermic peak having a peak within a temperature range of from 300° C. to less than 700° C. and an exothermic peak having a peak within a temperature range of from 700° C. to 745° C.; and
a surface functional group including oxygen within the second carbon phase, wherein an amount of the oxygen relates to the content of the second carbon phase, and the amount of oxygen in terms of an elemental composition of the carbon material is 0.5 to 5 atom %.

15. The anode material for a lithium ion secondary batter according to claim 14, wherein the surface functional group including oxygen is selected from the group consisting of C—O, C=O, C—OH and C—OOH.

16. The anode material for a lithium ion secondary batter according to claim 14, wherein a tapped density of the carbon material is from 0.5 g/cm³ to 2.0 g/cm³.

17. The anode material for a lithium ion secondary batter according to claim 14, wherein a tapped density of the carbon material is from 0.5 g/cm³ to 1.3 g/cm³.

18. The anode material for a lithium ion secondary batter according to claim 14, wherein a tapped density of the carbon material is from 0.3 g/cm³ to 2.0 g/cm³.

19. The anode material for a lithium ion secondary batter according to claim 14, wherein an adsorption amount of the carbon material at 273 K as determined by carbon dioxide adsorption measurement is from 0.1 cm³/g to 5.0 cm³/g.

* * * * *